United States Patent [19]

Rawlings

[11] Patent Number: 4,517,140

[45] Date of Patent: May 14, 1985

[54] DEVICE AND METHOD FOR CENTRIFUGALLY CASTING ARTICLES

[75] Inventor: David L. Rawlings, Bayville, N.Y.

[73] Assignee: International Hydron Corporation, New York, N.Y.

[21] Appl. No.: 490,598

[22] Filed: May 2, 1983

[51] Int. Cl.³ ............................................. B29D 11/00
[52] U.S. Cl. ........................................ 264/2.1; 65/302; 264/1.1; 264/297.8; 264/311; 425/434; 425/808
[58] Field of Search ................ 264/310, 311, 2.1, 297, 264/1.1; 65/71, 302; 425/808, 21, 434; 432/125

[56] References Cited

U.S. PATENT DOCUMENTS 3,107,141 10/1963 Crafton .
3,660,545 5/1972 Wichterle ............................ 264/1.4
3,790,336 2/1974 Brede .................................. 432/125

FOREIGN PATENT DOCUMENTS 159359 4/1974 Czechoslovakia .

*Primary Examiner*—Jay H. Woo
*Assistant Examiner*—Michael McGurk
*Attorney, Agent, or Firm*—Vincent P. Pirri

[57] ABSTRACT

A device and method for spin casting articles, such as lenses, employing a rotatable polymerization column in conjunction with a plurality of molds such that the column is adapted to accommodate a plurality of gravity fed molds in a loose mating engagement that insures rotation of the molds to be synchronized to the speed of rotation of the column to produce quality spun cast articles.

11 Claims, 12 Drawing Figures

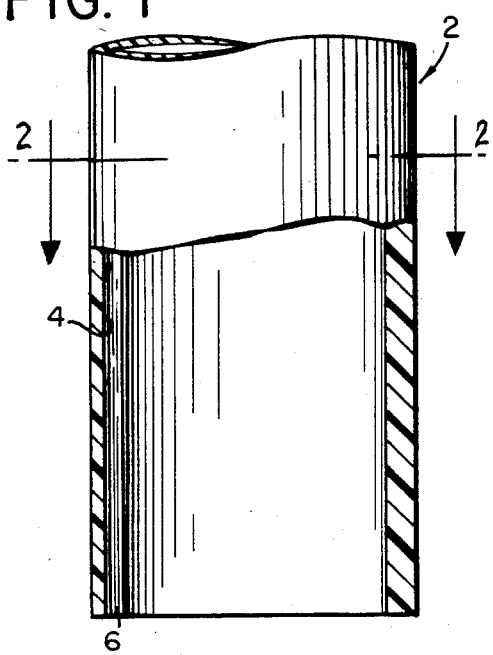
FIG. 1
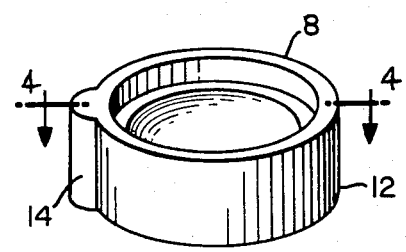
FIG. 3
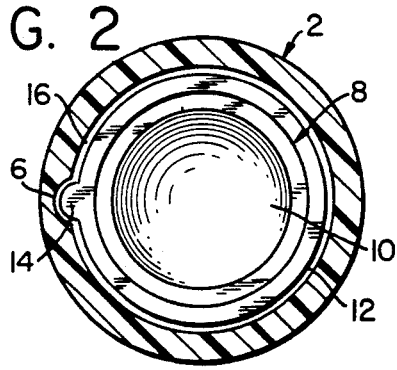
FIG. 2
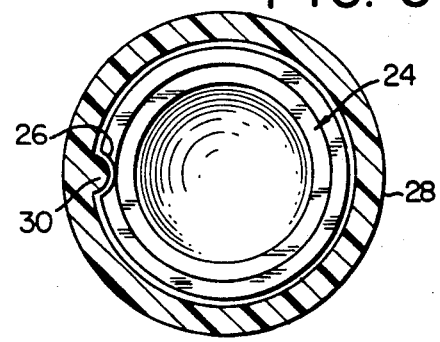
FIG. 4
FIG. 6
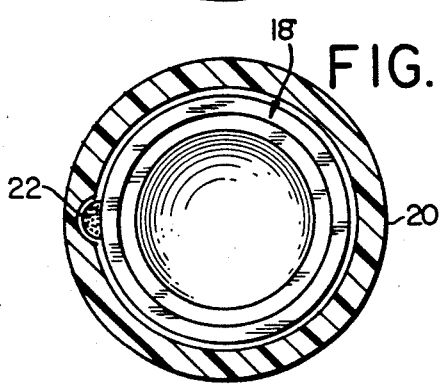
FIG. 5
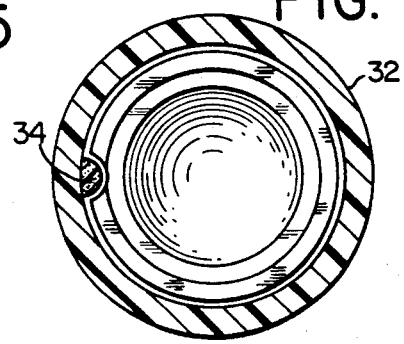
FIG. 7

DEVICE AND METHOD FOR CENTRIFUGALLY CASTING ARTICLES

TECHNICAL FIELD

The present invention relates to a device and method for centrifugally casting of a plurality of objects such as lenses, disc valves, and the like. In a more specific aspect, the present invention relates to a device and method employing a polymerization column adapted to accommodate a plurality of free falling molds in vertical alignment, and said molds and polymerization column having cooperative mating means, such as a tongue and groove arrangement, that will cause the synchronized rotation of the molds to the same speed of the column thereby effectively insuring the production of a plurality of spun cast articles.

BACKGROUND ART

It is known that the polymerization casting of axially symmetrical articles, such as contact lenses, can be performed by using equipment in which individual molds are arranged in a carousel or in a vertical stack configuration. These individual molds, characterized by an outer cylindrical wall and a mold cavity with an exposed concave bottom surface and containing a liquid polymerizable mixture in the cavity, are caused to rotate about their vertical axis at a rotational speed (and under polymerization conditions) sufficient to create a centrifugal force which causes a radially outward displacement of the liquid reactants in the mold. By maintaining the rotating mold(s) under predetermined and known polymerization conditions, the outwardly displaced liquid reactants are caused to polymerize to a solid polymeric contact lens. The resulting lens is characterized by a convex optical surface which corresponds to the concave surface of the mold and a concave optical surface whose geometry has been created, to a significant degree, by the centrifugal force(s) employed during the polymerization cycle.

In the centrifugal casting of contact lenses on a commercial scale, it is preferred for the attainment of good yield to effect the polymerization or curable reaction under an inert gaseous medium such as argon or nitrogen. This is due to the fact that the oxygen component of air entrained within the polymerization column can inhibit the polymerization reaction and adversely affect the quality and acceptability of the contact lens product. A controlled feed of nitrogen through the polymerization column will purge any entrained air in the polymerization zone and provide an inert environment for conducting the polymerization process.

The aforesaid carousel arrangement is rather complex and quite large with respect to the size of the molds. It requires that each mold be individually rotated on its own separate vertical axis. It is reported that the carousel arrangement suffers from the disadvantages of requiring excess inert gas to eliminate the inhibiting effect of oxygen (in the air) present during the polymerization reaction. The use of excess inert gas during the polymerization of the monomeric reactants causes the entrainment of monomer in the form of vapors and the subsequent deposition and/or polymerization on the walls and equipment. Further information is set forth in U.S. Pat. No. 3,660,545, issued May 2, 1972, the full disclosure of which is incorporated by reference as if set out in full text.

In the vertical stack arrangement a rotatable polymerization tube having an internal circular cross-sectional geometry is adapted to receive at one end of the tube a plurality of circular molds which become seated to one another in the said tube, each mold containing the liquid polymerizable reactants in the mold cavity. In operation, the molds are gravity fed into the upper end of the polymerization tube and free-fall through the tube against an upwardly flowing inert gas, e.g., carbon dioxide, due to their own weight. The exit end of the tube is seated tightly on a revolving plate member which imparts the rotation to the tube and which plate has a centrally defined opening for discharging inert gas into the polymerization tube to contact the descending gravity fed molds. In this type of construction, the revolving plate member would have to be disconnected and displaced from the polymerization column to remove the molds. In addition, the feeding of the inert gas from the center of the revolving plate member into the polymerization column and onto the bottom surface of the bottommost mold could impede the rotation of this mold and thereby prevent the molds within the tube from being rotated at the same speed due to undesirable slippage between the molds and the inner wall of the polymerization column.

OBJECTS OF THE INVENTION

Accordingly, one or more objects will be achieved by the practice of the invention.

Objects of the invention are to provide a device and method for centrifugally casting quality reproducible symmetrical or asymmetrical articles, such as lenses.

Another object of the present invention is to provide a centrifugal casting device employing a polymerization column adapted to accommodate a plurality of free falling molds in vertical alignment and said polymerization column and said molds having cooperative mating means to synchronize th rotation of the molds to the same speed of rotation as the polymerization column thereby effectively insuring the production of a plurality of spun cast articles at the same time.

Another object of the present invention is to provide a cooperative tongue and groove arrangement for the molds and the polymerization column of a centrifugal casting device so as to synchronize the rotation of the molds to the same speed of rotation as the polymerization column.

The foregoing and additional objects will become full apparent from the following description and accompanying drawings.

DISCLOSURE OF THE INVENTION

The invention relates to a device for casting articles comprising a rotatable polymerization column having an inlet end and an outlet end, said polymerization column adapted for rotation about a vertical axis and adapted for receiving a plurality of free falling molds containing a polymerizable or curable composition; cooperative mating means associated with said polymerization column and said molds for aligning said plurality of said free falling molds in vertical series within said polymerization column, said cooperative mating means being adapted for maintaining the rotation of said molds in synchronization with the same speed of rotation of said polymerization column; and gas feed means associated with the inner surface of said polymerization column and the outer wall of said molds to accommodate the flow of a gaseous medium through said polymerization column.

The invention also relates to a method for centrifugally casting of shaped articles comprising the steps:

(a) providing an elongated polymerization zone within a polymerization column, said column being adapted for receiving a plurality of gravity fed, free falling molds and said polymerization column and said molds having cooperative mating means for aligning said molds within said polymerization column;

(b) gravity feeding into one end of said polymerization column a series of said molds each containing a polymerizable or curable composition;

(c) rotating said polymerization column such that the cooperative mating means associated with said polymerization column and said molds maintains the rotation of said molds in synchronization with the same speed of rotation of said polymerization column, said rotation speed being sufficient to cause the polymerizable or curable composition to flow radially outward by centrifugal force in the cavity of each of said molds thereby said composition assuming or retaining a predetermined shaped article; and (d) stopping the rotation of the polymerization column and withdrawing said gravity fed, free falling molds from the opposite end of said polymerization column after at least said polymerizable or curable composition is formed into a predetermined shaped article in said polymerization zone, said article preferably being a hydrophilic, water-swellable, water insoluble solid, e.g., soft contact lenses well known in the art.

As used herein, a polymerization column shall mean a polymerization tube which provides a polymerization zone under which polymerizable conditions can convert fluid polymerizable or curable material of predetermined configuration into predetermined shaped solid articles or shall mean a conditioning tube coaxially mounted and secured above a polymerization tube such that the conditioning tube will provide a conditioning zone which when rotated at a predetermined speed, preferably under an inert atmosphere, will cause and/or maintain the radially outward displacement of fluid polymerizable or curable material in the cavity of the molds contained therein to assume a predetermined configuration. Thereafter the molds can be fed or advanced into the polymerization zone of the polymerization tube to convert the fluid polymerizable or curable material into predetermined shaped solid article. Preferably the conditioning tube and polymerization tube should be rotated at the same speed.

Desirably, the device can have gas feeding means for directing an inert gaseous medium through the rotating polymerization column containing the rotating molds. It is preferred that in the spin casting of soft contact lenses, the gaseous medium be an inert gas of argon or nitrogen. This is due to the fact that undesirable air entrained within the tube during polymerization will inhibit the polymerization process and thereby result in a product of unacceptable quality. A feed of inert gas, such as nitrogen, through the polymerization tube will purge any entrained air and provide an inert environment for the polymerization process to occur. The novel gas feed means disclosed in copending application Ser. No. 490,626 filed on May 2, 1983 now U.S. Pat. No. 4,468,184 by the same assignee of the subject application can be used. The disclosure made in this application, to the extent intended herein, is incorporated by reference as if set out in full text.

In the preferred operational mode of this invention, the stationary polymerization column is loaded with fluid-filled molds from a mold magazine and then the column is rotated at a predetermined speed to cause the polymerization process to occur. Once the process is completed, the rotation of the column is stopped and the molds containing the cast articles are removed and the cycle is then repeated.

The cooperative mating means of this invention can comprise at least one tongue and groove arrangement, preferably at least two tongue and groove arrangements, that would insure that gravity feed, free falling molds are aligned within the column in a locking engagement that will synchronize the rotation of the molds to the same speed as the rotation of the polymerization column. The male tongue could be disposed either on the external wall of the mold or the internal surface of the polymerization column with the female groove being disposed opposite in the other component. To insure free falling of the molds within the polymerization column, while maining synchronous rotation of the molds and column, the dimensions of the projected tongue member and dimensions of the groove do not result in a friction or interference fit when engaged with each other, i.e., there is a close engagement and slidable relationship of the molds and column. The configuration of the cross section of the groove and tongue could be of any contour as long as the tongue is smaller than its mating groove to permit free falling of the molds into and through the polymerization column. The material constituting the projected tongue could form an integral part of either the mold or the polymerization column or it could be fabricated of a different material secured to the outer wall of the mold or the inner surface of the polymerization column in a conventional manner using an adhesive or the like.

By the practice of the inventions contemplated herein, there can be produced precision articles of predetermined and exacting details and dimensions, e.g., small medical devices such as heart valves and diaphragms; contact lenses; and others. Such articles, depending on the ultimate use, can be hard, flexible, or soft and they may be hydrophillic or hydrophobic.

Any fluid polymerizable, curable or moldable reactant or mixture with/without an inert or reactive solvent which is/are capable of being displaced outwardly due to the rotation of the column, i.e., by the resultant centrifugal forces, can be employed in the practice of the invention. The medium comprising the reactant(s) constitute a homogenous liquid and is capable of forming a desired shaped article during the centrifugal casting operation. The article may be opaque, translucent or transparent depending onto the ultimate use of the cast article formed. For instance, it is not generally a necessity that diaphragms and artificial heart valve substitutes obtained by the practice of the invention be colorless and transparent. On the other hand, for example, it is a requirement that soft hydrophilic contact lenses be fully transparent, of good optical quality, soft and resilient as well as possessing other necessary and desirable characteristics.

In particular, the centrifugal casting device of this invention coupled to gas feeding means can be utilized in the manufacture of a wide variety of contact lenses which can be symmetrical or asymmetrical; hard, flexible or soft; water absorptive or non-water absorptive; low, medium, or high oxygen permeability or transportability; and the like. By choosing suitably designed mold cavities or bottoms there can be obtained a wide variety of modified lens shapes, e.g., toric, bifocal, truncated and/or ballasted contact lenses. A wide variety of materials or construction can be employed to fabricate the molds; see, for example, U.S. Pat. No. 3,660,545. For the preparation of hydrophilic articles such as soft contact lenses a mold fabricated of a thermoplastic material, such as polypropylene, is suitable. To insure proper wetting of the optical surface of the mold by the lens-forming mixture it is desirable to first pretreat or hydrophilize the said surface by known methods.

The liquid lens-forming mixture can comprise monomer, prepolymer or vulcanizable components. Particular suitable components are hydrophilic monomers preferably including those which form slightly or moderately crosslinked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl substituted N-vinylpyrrolidone; glycidyl methacrylate; glycidyl acrylate; the unsaturated amines; the alkyl ethyl acrylates; solubilized collagen; mixtures thereof; and others known to the art.

Hydrophilic monomers particularly useful in the practice of the invention to manufacture contact lenses include hydrophobic acrylic esters, suitably lower alkyl acrylic esters, preferably wherein the alkyl moiety contains 1-5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in full text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated above.

The above illustrated monomers, monomeric mixtures including mixtures of hydrophobic and hydrophilic reactants, may be further admixed with a minor proportion of di- or polyfunctional polymerizable species to cause crosslinking of the polymeric matrix as polymerization or curing proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. patents: U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent comprises a minor amount of the reaction medium, i.e., less than about 50 weight percent.

Polymerization of the lens-forming mixture may be carried out with free radical catalysts and/or initiators of the type in common use in vinyl polymerization. Such catalyst species can include the organic peroxides, the alkyl percarbonates, hydrogen peroxides, and inorganic materials such as ammonium, sodium, or potassium persulfate. Polymerization temperatures can vary from about 20° C., and lower, to about 100° C., and higher.

Polymerization of the monomer or prepolymer material can also be effected using, for example, radiation (U.V., X-ray, microwave, or other well-known forms of radiation) with/without the presence of well-known initiator(s) and/or catalyst(s).

When using radiation as the catalyst in the polymerization process, the polymerization column (tube) is fabricated from a material that will not impede the transmission of the radiation into the polymerization zone of the column. Glass, such as Pyrex, would be a suitable material for the polymerization column when using radiation as the catalyst. When using other types of catalysts as recited above, the polymerization column could be fabricated from various types of metals such as steel, bronze and the like.

The shape of a lens blank may be controlled not only by the size and shape of the mold, but also by the amount and nature of the components comprising the lens-forming mixture, by the synchronized rotational speed of the column and mold during polymerization, by the position of the axis of rotation of the column and mold relative to the direction of gravity, by axis of rotation of the column relative to the optical axis of the (formed) lens in the mold cavity, and the like. Tilting the axis of rotation or when the axis of rotation does not pass through the optical center of the (forming) lens, a prism component can be added to the lens.

In the fabrication of contact lenses, the lens-forming material is placed in the mold cavity having an optical concave surface wetted by said material, and then fed one at a time into the inlet end of polymerization column which desirably comprises a "conditioning" zone near the inlet end and a polymerization reaction zone toward the outlet end. It is preferred that the molds be characterized by a pretreated optical surface to increase its hydrophilicity or wettability in a manner well-known in the art. The speed of rotation of the column and the molds is then adjusted to cause and/or maintain radially outward displacement of the lens-forming mixture to a predetermined lens configuration which when subjected to the polymerization conditions employed in the column will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed previously and readily apparent to the artisan.

It is pointed out that the word "column" in this specification is used in a generic sense and includes a "tube" whose external as well as its hollow internal cross-sectional areas can represent, partially or in toto, by way of illustrations, a circle, triangle, square, or the shape of a polygon, preferably a regular or substantially regular polygon, such as a pentagon. In like manner, the cross-sectional shape of the mold(s) disposed within the tube can assume any of the foregoing illustrative configurations. In the foregoing illustrations, the cooperative mating means, e.g., tongue and groove arrangement, is of course retained in accordance with the teachings disclosed and suggested herein. Thus, when the internal cross sectional area defines a circle, the circumference thereof is interrupted by its cooperative mating means portion. It is not necessary that the cross-sectional shapes of the column and of the mold be the same. For example, the hollow cross sectional shape of the column can represent a square and the horizontal cross sectional area of the mold can represent a circle provided, in this illustration, that the external diameter of the mold is slightly smaller than the length of one side of the square.

BRIEF DESCRIPTION OF DRAWING

The present invention will become more apparent from the following description when considered together with the accompanying drawing which is set forth as being exemplary of embodiments of the present invention and is not intended in any way to be limited thereof and wherein FIG. 1 is a side elevational view partly in cross-section of a polymerization tube of this invention.

FIG. 2 is a cross sectional view taken through the polymerization tube of FIG. 1.

FIG. 3 is a perspective view of a novel mold for use in the novel polymerization tube of this invention.

FIG. 4 is a cross sectional view taken along line 4—4 of FIG. 3.

FIG. 5 is a cross sectional view of another embodiment of a novel polymerization tube showing a novel mold disposed within said polymerization tube using a tongue and groove arrangement.

FIG. 6 is a cross sectional view of another embodiment of a novel polymerization tube showing a novel mold disposed within said polymerization tube using a tongue and groove arrangement.

FIG. 7 is a cross sectional view of another embodiment of a novel polymerization tube showing a novel mold disposed within said polymerization tube using a tongue and groove arrangement.

DETAILED DESCRIPTION OF DRAWING

Figure 8:
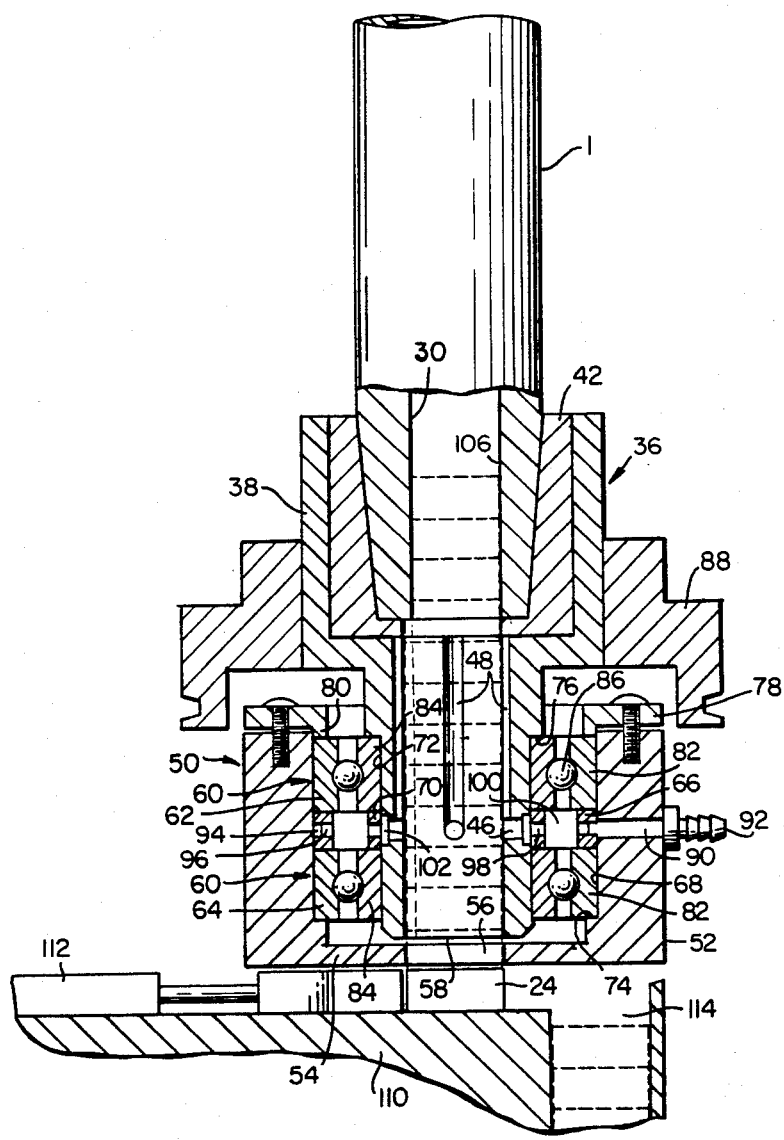
FIG. 8 is a side elevational view partly in cross-section of a gas feed means suitable for use in this invention.

Referring in detail to FIGS. 1 and 2, there is shown in polymerization tube 2 made of an inert material such as glass, metal, plaster, metal alloys and the like. Disposed on the inner surface 4 of polymerization tube 2 is a longitudinal groove 6. FIGS. 3 and 4 show a mold 8 having mold cavity 10 and a cylindrical wall 12 having a projected tongue 14 made as an integral part of mold 8. The shape of cavity 10 can assume any desired shape that is to be imparted to the finished article, such as an axially symmetrical or asymmetrical shaped article. Referring specifically to FIG. 2, mold 8 in shown disposed within polymerization tube 2 with projected tongue 14 on mold 8 loosely mated within groove 6 of tube 2. This tongue 14 and groove 6 arrangement aligns molds 8 within tube 2 and synchronizes the rotational speed of molds 8 to the speed of rotation of tube 2. The cross sectional dimensions of projected tongue 14 are smaller than the cross sectional dimensions of groove 6 to enable molds 8 to be gravity fed and free fall through tube 2. Channels 16 formed between outer wall 12 of mold 8 at the inner surface of tube 2 permit a gaseous medium, such as an inert gas, to be directed through rotating tube 2 in a conventional manner using conventional means. Although not shown, a conditioning tube could be mounted at the input end of polymerization tube 2 and preferably rotated at the same speed of rotation as the polymerization tube 2. A primary benefit in the use of a conditioning tube in conjunction with polymerization tube 2 of this invention is that it can be rotated to insure that the polymerization or curable composition in the mold cavity 10 assumes or retains the desired shape of the article prior to being polymerized in the polymerization tube.

FIG. 5 shows a similar tongue and groove arrangement for mold 18 and tube 20 as that shown in FIG. 2 except that the projected tongue 22 is made of a different material than mold 18.

In FIG. 6 a mold 24 is shown with groove 26 disposed within polymerization tube 28. Polymerization tube 28 has a projected tongue 30 loosely mated within groove 26 to allow for free falling of molds 24 through polymerization tube 28. In FIG. 6, tongue 30 is shown made of the same material as polymerization tube 28 while in FIG. 7, polymerization tube 32 is shown having tongue 34 made of a different material than polymerization tube 32.

Figure 9:
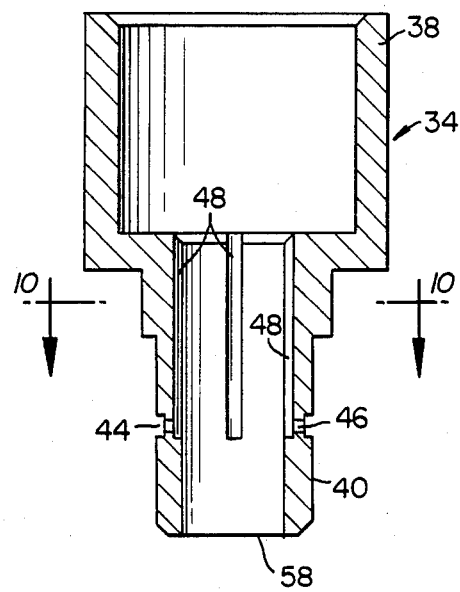
FIG. 9 is a side elevational view in cross-section of the rotatable sleeve member shown in FIG. 8.
Figure 10:
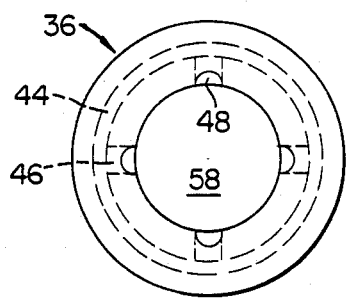
FIG. 10 is a view taken along the lines 10—10 of FIG. 9.

Referring in detail to FIGS. 8 to 10, there is shown a gas feed means suitable for use in conjunction with the novel polymerization column of this invention, said gas feed means being described in copending application Ser. No. 490,626 filed on May 2, 1983 now U.S. Pat. No. 4,468,184 as discussed above. Specifically, the gas feed means includes a rotatable sleeve member 36 having an upper tubular section 38 and a lower tubular section 40. As will be seen, the upper tubular section 38 has a larger cross-sectional area than polymerization column 1 and the lower tubular section 40. Disposed within the upper tubular section 38 is a resilient liner material 42, preferably plastic, that is slightly tapered and adapted for receiving the lower end of polymerization column 1 in frictional securement therein. As shown, the lower end of polymerization column 1 is slightly tapered to permit easy insertion and securement of polymerization tube 1 within liner 42. Although liner 42 is preferably made of plastic, it can be made of any resilient material that would be suitable for securing the lower end of the polymerization column 1 in frictional securement within said liner 42 so that rotation of sleeve member 36 will impart synchronized rotation to polymerization column 1. As shown in FIG. 7, the inner diameter of polymerization column 1 is smaller in diameter than the inner diameter of lower tubular section 40 of sleeve 36 and aligned therewith so that molds 24 (shown in outline form in FIG. 8 and shown in a plan view in FIG. 6) exiting from polymerization column 1 will be fed into and descend unimpeded through lower tubular section 40 of sleeve 36.

FIG. 8 illustrates an embodiment using molds 24 as shown in FIG. 6 having a groove 26 adapted to accommodate tongue 30 disposed on the inner wall of polymerization column 1. The inner diameter of tubular section 40 is shown large enough to accommodate free falling molds 24. The vertical broken lines shown on the left side of the molds 24 illustrate the location of grooves 26 in the molds 24. If molds illustrated in FIG. 3 are used then the inner diameter of tubular section 40 would have to be sufficiently large to accommodate the diameter of the molds including the extended tongue in a free falling arrangement. If desired, the inner diameter of tubular section 40 could be fabricated with a tongue of the type shown in FIGS. 6 and 7 for polymerization columns 28 and 32, respectively, to accommodate a mold having a groove in its upstanding wall. In a like manner, the inner diameter of tubular section 40 could be fabricated with a groove of the type shown in FIGS. 2 and 5 for polymerization columns 2 and 20, respectively, to accommodate a mold having a tongue extending from its upstanding wall. In any embodiment wherein the tubular section 40 is fabricated with a tongue or groove, then the polymerization column will have to be aligned so that the tongue or groove in the column is aligned with the tongue or groove in tubular section.

As shown in FIGS. 8, 9 or 10, a circumferential groove 44 is formed in the outer wall surface of lower tubular section 40 and a plurality of gas inlet openings 46 are circumferentially disposed through and defined by the base of groove 44. A plurality of longitudinal grooves 48 are formed in the inner wall of lower tubular section 40 with each groove 48 extending from a communicating gas inlet opening 46 up through the top of lower tubular section 40. Thus gas entering inlet opening 46 when molds 24 are disposed within lower tubular section 40 will be at least partially directed up through grooves 48 and into the interior of polymerization column 1.

Referring to FIG. 8, lower tubular section 40 of sleeve 36 is disposed within a cylindrical cupped support member 50 having an upstanding cylindrical wall 52 and a base 54 defining an opening 56 which is axially aligned with the opening 58 of lower tubular section 40. Disposed between the upstanding cylindrical wall 52 and lower tubular section 40 is a cylindrical preloaded bearing pair 60 including an upper bearing 62 and a lower bearing 64. Separating the bearing pair 60 and supporting upper bearing 62 is an outer support ring 66 disposed adjacent the internal wall 68 of support member 50, and an inner support ring 70 disposed adjacent the outer wall 72 of lower tubular section 40. In assembling the unit, the lower bearing 64 is placed into the cylindrical cupped support member 50 such that its lower surface rests on flange 74. Outer support ring 66 and inner support ring 70 are then disposed on top of lower bearing 64 whereupon upper bearing 62 can then be mounted on top of outer support ring 66 and inner support ring 70. When rotatable sleeve member 36 is inserted within support 50, circular flange 76 disposed on the outer wall of lower tubular section 40 secures the upper bearing 62 in place. A securing ring 78 having an L-shaped cross section is detachably secured to the top of support member 50 by any suitable means such as the threaded elements shown, with its internal flange member 80 securing the upper bearing 62 in proper alignment within support member 50. Each of the bearings 62 and 64 includes an outer fixed race 82 and an inner rotatable race 84 which are spaced apart by conventional ball bearings 86. By this arrangement, sleeve member 36 can be rotated within support member 50 by conventional fly wheel means illustrated generally as 88 and which is operatively associated with a conventional motor driven belt means not shown.

Figure 11:
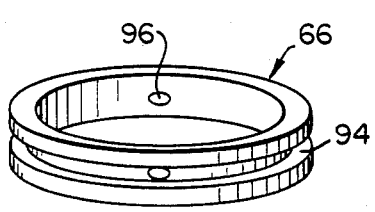
FIG. 11 is a perspective view of the outer support ring member for the bearing pair shown in the gas feed means of FIG. 8.
Figure 12:
FIG. 12 is a perspective view of the inner support ring member for the bearing pair shown in the gas feed means of FIG. 8.

Support member 50 is provided with an opening 90 defined in its side wall into which is secured a hose bar 92 which is adapted to be connected to a gaseous supply means not shown. In FIG. 11 outer support ring 66 is provided with an angular groove 94 disposed in its outer wall. A plurality of openings 96 are circumferentially disposed in the base of groove 94 and extends through its upstanding wall. As shown in FIG. 12, inner support ring 70 defines a plurality of openings 98 extending through its upstanding wall. Referring again to FIG. 8, it will be seen that the spaced apart preloaded bearing pair 60 and the spaced apart outer support ring 66 and inner support ring 70 define an annular zone 100.

In the operational mode and with reference to FIGS. 8 to 12, a gaseous medium fed through opening 90 travels along and within circumferential groove 94 and is directed through openings 96 and into annular zone 100. The gaseous medium is then directed through openings 98 in inner support ring 70, into and through openings 46 of lower tubular section 40 and up grooves 48 into the interior of polymerization column 1. The height of inner support ring 70 is greater than the width of circumferential groove 44 in tubular section 40 so that when inner support ring 70 is positioned adjacent groove 44, a circumferential zone 102 is defined that can accommodate a gaseous medium fed through openings 98 of inner support ring 70. This will allow a uniform gas flow to be fed through gas inlet openings 46 and up through grooves 48 into the polymerization column 1.

In the operational mode, molds 24 containing a polymerizable or curable compound in their cavities are gravity fed into polymerization column 1 which is then rotated. Molds 24 ejected into tubular section 40 will effectively prevent any gaseous medium fed through openings 46 from escaping out opening 58 of tubular section 40. Thus the gaseous inert medium will flow up through grooves 48 into the interior of polymerization column 1 between the peripheral wall of molds 24 and the inner surface of polymerization column 1 defined by the molds 24 which are gravity fed and free fall through polymerization column 1. The inner wall 106 of polymerization column 1 has a longitudinal tongue 30 to accommodate a groove 26 on molds 24. The inert gas fed up through polymerization column 1 will purge any entrained, undesirable gas such as oxygen in polymerization column 1 which could effect the quality and acceptability of the articles being casted. As shown in FIG. 8, a gravity descended mold 24 exited through opening 50 of the gas feed means will be supported on member 110 whereupon a conventional pusher means 112 will advance the ejected mold 10 to a receptacle 114.

The preload bearing pair 60, desirably incorporates seals of a conventional type which would provide a retention of lubricants for the bearings. These seals would serve to define the circumferential zone 100 and effectively prevent the escape of any gas to areas other than through the plurality of openings 46 in tubular section 40 of sleeve 36.

A requirement in all the embodiments of this invention is that a coacting mating means be associated with the molds and polymerization column to provide a loose engagement of said molds within said polymerization tube which will permit free fall of the molds through the polymerization column while maintaining synchronization of the rotation of the molds to the same speed as the rotation of the column.

EXAMPLE 1

Polypropylene molds (FIG. 3) having a concave spherical optical surface in the mold cavity can be used in the centrifugal casting of contact lens. The mold dimensions can be: outside diameter—17 mm; inner diameter above mold cavity—15.6 mm; height of mold—7.5 mm; diameter of mold cavity—13.2 mm; central mold cavity radius—7.7 mm; depth of mold cavity (max)—3.3 mm; width of circular horizontal mold shoulder (located between the inner mold wall and mold cavity)—1.2 mm. The hydrophilicity or wettability of the optical surface of the molds can be enhanced by treatment in an oxygen, low temperature, plasma chamber for approximately 18 seconds, 50 watts gauge setting (Model LTA-302, Low Temperature Asher, LFE Corporation, Waltham, Mass.). To a series of these molds, there can be charged, individually, a metered amount of the lens-forming mixture, i.e., approximately 20 milligrams. The lens-forming mixture (based on total weight) could comprise the following recipe:

Components (Parts by Wt.)

2-Hydroxyethyl Methacrylate: 84.6
Ethylene Glycol Dimethacrylate: 1.0
Benzoin Methyl Ether (initiator): 0.2
Glycerol: 14.2

The molds can be transported laterally, on a conveyor belt or by positive force means, to the inlet end of a rotating Pyrex column which is supported in an upright position by support means. Said Pyrex column being generally as shown in FIG. 1 as polymerization column 1. The molds can be gravity fed downwardly into the vertical column until the column is filled. When the column is filled with molds (capacity can vary, for instance, from 60 to 120 molds), the column can be inserted into a gas feed means as shown in FIG. 8. The speed of rotation of the column about its vertical axis can be about 400 r.p.m. and total residence time of each mold in the column can be about 20 minutes. The rotating column can be maintained at ambient room temperature, i.e., about 20°-22° C. with nitrogen continually flowing upward in grooves 48 (see FIGS. 8 to 10) into the polymerization column 1 to remove any entrained oxygen in the column. In the so-called "conditioning" zone in the upper portion of the column, centrifugal forces created by the column rotation will cause the radially outward displacement of the liquid lens-forming mixture in the spherical mold cavity to be formed onto a predetermined lens shape. The "conditioning" of said liquid material should be maintained for a period of about 15 minutes in its downward decent in the conditioning zone to the polymerization zone. The polymerization zone of the column should likewise be maintained at ambient room temperature. The polymerization reaction can be conducted using UV radiation from a source outside the column (UV source: medium pressure, mercury arc, UV emission—300-400 nm, infrared is filtered, and lamp distance is 3 inches). The residence time in the polymerization zone should be about 5 minutes and then the rotation of the column can be stopped and the molds removed. A longer residence period can be employed, if desired, as well as subjecting the shaped contact lens blank still in the cavity of the mold to post-cure conditions. Immersion in distilled water causes the hydrophilic lens blank to swell which (swelling) causes the separation of the contact lens from the mold. Repeated washings in distilled water insures removal of catalyst or initiator residue and unreacted monomer(s). The contact lens should be finally immersed in physiologic solution (0.09% saline) until it reaches osmotic equilibrium with the solution.

The finished lens will generally have a refractive power (wet) of −6 diopters. It will be optically clear, transparent, inert to bacteria, biocompatible with the cornea, water content of about 39% by weight, dimensionally stable, and exhibits good mechanical properties. It is useful as a daily wear "soft" contact lens. The above cycle can then be repeated to produce another plurality of cast articles.

EXAMPLE 2

The procedure of Example 1 can be repeated using the following recipe:

Components (Parts by Weight)

2-Hydroxyethyl Methacrylate: 78
Methacrylic Acid: 2
Isopropylpercarbonate: 0.4
Glycerol: 19
Ethylene Glycol Dimethacrylate: 1.0
(No UV source)

Polymerization Zone Conditions:
70° C.; residence time: 6 minutes.

This will produce a contact lens that is optically clear, transparent, inert to bacterial, biocompatible with living tissue, highly water-swellable, water-insoluble, dimensionally stable, and of good mechanical strength.

EXAMPLE 3

The procedure of Example 1 can be repeated using the following recipe:

Components (Parts by Weight)

2-Hydroxyethyl Methacrylate: 95
Methyl Methacrylate: 5
Vazo$^R$ 33: 0.2
Propylene Glycol: 10
Ethylene Glycol Dimethacrylate: 0.5
$^R$Registered Trademark of du Pont.

Polymerization Zone Conditions:
70° C.: reisdence time: 6 minutes.

This will produce a contact lens that is optically clear, transparent, inert to bacteria, biocompatible with living tissue, water-swellable, water-insoluble, dimensionally stable, and of good mechanical strength.

Modification of the mold cavity and of the recipe results in a wide variety of useful and suitable contact lenses as taught in U.S. Pat. No. 3,660,545, the full disclosure of which is incorporated by reference as if set out in full text.

I claim:

1. A device for casting contact lenses comprising a rotatable polymerization column having an inlet end and an outlet end, said polymerization column adapted for rotation about a vertical axis and adapted for receiving a plurality of gravity fed free falling molds containing a polymerizable or curable composition; cooperative mating means associated with said polymerization column and said molds for aligning said plurality of said molds in vertical series within said polymerization column; said cooperative mating means adapted for maintaining the rotation of said molds in synchronization with the same speed of rotation of said polymerization column; and gas feed means associated with the inner surface of said polymerization column and the outer wall of said molds to accommodate the flow of a gaseous medium through said polymerization column.

2. The device of claim 1 wherein said cooperative mating means comprises at least one tongue and groove arrangement in which the cross sectional dimensions of the tongue are smaller that the cross sectional dimensions of its mating groove thereby permitting the molds to free all through said column while maintaining the rotation of said molds in synchronization with the same speed of rotation of said polymerization column.

3. The device of claim 2 wherein said at least one groove is formed on the inner surface of said polymerization column and said at least one mating tongue is disposed on the outer wall of the molds.

4. The device of claim 3 wherein said at least one tongue is made of the same material as said molds.

5. The device of claim 3 wherein said at least one tongue is made of a different material than said molds.

6. The device of claim 2 whereby said at least one groove is formed on the outer wall of said molds and said at least one mating tongue is disposed on the inner surface of said polymerization column.

7. The device of claim 6 wherein said at least one tongue is made of the same material as said polymerization column.

8. The device of claim 6 wherein said at least one tongue is made of a different material than said polymerization column.

9. A method for centrifugally casting of shaped contact lenses comprising the steps:
    (a) providing an elongated tubular polymerization zone within a polymerization column, said column being adapted for receiving a plurality of gravity fed, free falling molds, and said polymerization column and said molds having cooperative mating means for aligning said molds within said polymerization column;
    (b) gravity feeding into one end of said polymerization column a series of said molds each containing a polymerizable or curable composition;
    (c) rotating said polymerization column such that the cooperative mating means associated with said polymerization column and said molds maintains the rotation of said molds in synchronization with the same speed of rotation of said polymerization column, said rotation speed being sufficient to cause the polymerizable or curable composition to flow radially outward by centrifugal force in the cavity of each of said molds thereby said composition assuming a predetermined shaped contact lenses; and
    (d) stopping the rotation of the polymerization column and withdrawing said gravity fed molds from the opposite end of said polymerization column after at least said polymerizable or curable composition is formed into a predetermined shaped contact lenses in said polymerization zone.

10. The method of claim 9 wherein in step (b) an inert gas is fed through said rotating polymerization column.

11. The method of claim 10 wherein the rotation of each mold is effected in a plane which is substantially perpendicular to the longitudinal axis of said elongated tubular polymerization zone.

* * * * *